US012169482B2

(12) United States Patent
Pickerill et al.

(10) Patent No.: US 12,169,482 B2
(45) Date of Patent: *Dec. 17, 2024

(54) CODE PACKAGER WITH SQL PARSER

(71) Applicant: LIQUIBASE INC., Austin, TX (US)

(72) Inventors: Peter James Pickerill, Austin, TX (US); Nathan Owen Voxland, Moorhead, MN (US)

(73) Assignee: LIQUIBASE INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/951,211

(22) Filed: Sep. 23, 2022

(65) Prior Publication Data
US 2023/0090874 A1    Mar. 23, 2023

Related U.S. Application Data

(63) Continuation of application No. 16/953,411, filed on Nov. 20, 2020, now Pat. No. 11,494,349.

(60) Provisional application No. 62/939,395, filed on Nov. 22, 2019.

(51) Int. Cl.
| | |
|---|---|
| *G06F 16/21* | (2019.01) |
| *G06F 8/60* | (2018.01) |
| *G06F 8/76* | (2018.01) |
| *G06F 8/77* | (2018.01) |

(52) U.S. Cl.
CPC .............. *G06F 16/213* (2019.01); *G06F 8/60* (2013.01); *G06F 8/76* (2013.01); *G06F 8/77* (2013.01)

(58) Field of Classification Search
None
See application file for complete search history.

(56) References Cited

U.S. PATENT DOCUMENTS

| | | | | |
|---|---|---|---|---|
| 5,875,334 | A  * | 2/1999 | Chow ................... | G06F 8/433 717/139 |
| 9,971,595 | B1 * | 5/2018 | Thompson ............. | G06F 8/71 |
| 10,268,709 | B1 * | 4/2019 | Suehs ................... | G06F 16/211 |
| 2005/0149537 | A1 * | 7/2005 | Balin ..................... | G06F 16/214 |
| 2005/0256834 | A1 * | 11/2005 | Millington ............ | G06F 16/972 |
| 2011/0093513 | A1 * | 4/2011 | Joshi ..................... | G06F 16/25 707/804 |
| 2012/0266244 | A1 * | 10/2012 | Green ................... | H04L 63/145 726/24 |
| 2014/0250055 | A1 * | 9/2014 | Kuspa .................. | G06F 16/48 707/E17.014 |

(Continued)

OTHER PUBLICATIONS

L. Meurice, C. Nagy and A. Cleve, "Detecting and Preventing Program Inconsistencies under Database Schema Evolution," 2016 IEEE International Conference on Software Quality, Reliability and Security (QRS), Vienna, Austria, 2016, pp. 262-273, doi: 10.1109/QRS.2016.38. (Year: 2016).*

(Continued)

*Primary Examiner* — Andrew M. Lyons
(74) *Attorney, Agent, or Firm* — Sprinkle IP Law Group

(57) ABSTRACT

Database servers may maintain a database according to a database schema. A database change management system can include a profile service configured to collect database profile information. A forecast service can be configured to use SQL parsing to generate change objects and generate a forecast report indicative of a prediction of a failure or success of an implementation of the set of changes.

20 Claims, 19 Drawing Sheets

(56) References Cited

U.S. PATENT DOCUMENTS

| | | | | |
|---|---|---|---|---|
| 2015/0227756 A1* | 8/2015 | Barbas | ............... | G06F 21/6227 |
| | | | | 707/783 |
| 2018/0060177 A1* | 3/2018 | Shanthaveerappa | ......................... | |
| | | | | G06F 16/113 |
| 2019/0308104 A1* | 10/2019 | Nicolades | ............... | A63F 13/35 |
| 2021/0124647 A1* | 4/2021 | Kasani | ............... | G06F 16/2219 |

OTHER PUBLICATIONS

R. M. Marks, "A Metadata Driven Approach to Performing Multi-vendor Database Schema Upgrades," 2012 IEEE 19th International Conference and Workshops on Engineering of Computer-Based Systems, Novi Sad, Serbia, 2012, pp. 108-116. (Year: 2012).*

* cited by examiner

Deploy

```
-- create table T_CUSTOMER                  ——1102
CREATE TABLE "DATDBA"."T_CUSTOMER"
("CUSTOMER_ID" NUMBER(*,0) NOT NULL ENABLE,
"NAME" VARCHAR2(20 CHAR),
"ADDRESS" "DATDBA"."CUST_ADDRESS_TYPE",
CONSTRAINT "PK_T_CUSTOMER" PRIMARY KEY ("CUSTOMER_ID")
)
STORAGE(INITIAL 65536 NEXT 1048576 MINEXTENTS 1 MAXEXTENTS 2147483645
PCTINCREASE 0 FREELISTS 1 FREELIST GROUPS 1 BUFFER_POOL DEFAULT FLASH_CACHE
DEFAULT CELL_FLASH_CACHE DEFAULT)
TABLESPACE "USERS" ;

COMMENT ON COLUMN "DATDBA"."T_CUSTOMER"."NAME" IS 'Name column can contain First and
Middle name. Surname must be in different column.';

CREATE INDEX "DATDBA"."I_NAME" ON "DATDBA"."T_CUSTOMER" ("NAME")
TABLESPACE "USERS" ;
```

FIG. 11

```
CREATE TABLE "DATDBA"."T_CUSTOMER"
("CUSTOMER_ID" NUMBER(*,0) NOT NULL ENABLE,
"NAME" VARCHAR2(20 CHAR),
"ADDRESS" "DATDBA"."CUST_ADDRESS_TYPE",
CONSTRAINT "PK_T_CUSTOMER" PRIMARY KEY ("CUSTOMER_ID")
)
STORAGE(INITIAL 65536 NEXT 1048576 MINEXTENTS 1 MAXEXTENTS 2147483645
PCTINCREASE 0 FREELISTS 1 FREELIST GROUPS 1 BUFFER_POOL DEFAULT FLASH_CACHE
DEFAULT CELL_FLASH_CACHE DEFAULT)
TABLESPACE "USERS" ;

COMMENT ON COLUMN "DATDBA"."T_CUSTOMER"."NAME" IS 'Name column can contain First and
Middle name. Surname must be in different column.';

CREATE INDEX "DATDBA"."I_NAME" ON "DATDBA"."T_CUSTOMER" ("NAME")
TABLESPACE "USERS" ;
```

```
0 = {TokenStream@3102} "CREATE INDEX DATDBA.I_NAME ON DATDBA.T_CUSTOMER (NAME) TABLESPACE USERS"
    database = (OracleDatabase@1624) "oracle Database"
    tokens = {ArrayList@3104} size = 8
        0 = {KeywordToken@3107} "DATDB.T_CUSTOMER"
        1 = {KeywordToken@3108} "INDEX"
        2 = {ObjectNameToken@3109} "DATDBA.I_NAME"
        3 = {KeywordToken@3110} "ON"
        4 = {ObjectNameToken@3111} "DATDB.T_CUSTOMER"
        5 = {GroupedTokens@3112} "(NAME)"
            startToken = "("
            groups = {ArrayList@3124} size = 1
                0 = {TokenStream@3127} "NAME"
                    database = (OracleDatabase@1624) "oracle Database"
                    tokens = {ArrayList@3129} size = 1
                        0 = {ObjectNameToken@3132} "NAME"
            endToken = ")"
        6 = {KeywordToken@3113} "TABLESPACE"
        7 = {ObjectNameToken@3114} "USERS"
```

FIG. 13B

```
▸ ▦ tokenizedStatement= [TokenizedStatement@1845] "CREATE TABLE DATDBA.T_CUSTOMER (CUSTOMER_ID NUMBER (*,0) NOT NULL
    ENABLE, NAME VARCHAR2 (20 CHAR), ADDRESS DATDBA.CUST_ADDRESS_TYPE, CONSTRAINT PK_T_CUSTOMER PRIMARY KEY (C
  ▸ ⓕ rawSql="CREATE TABLE "DATDBA"."T_CUSTOMER"\n( "CUSTOMER_ID" NUMBER(*,0) NOT NULL ENABLE, \n"NAME" VARCHAR2(20
       CHAR),\n"ADDRESS" "DATDBA"."CUST_ADDRESS_TYPE" ,\nCONSTRAINT "PK_T_CUSTOMER" PRIMARY KEY ("CUSTOM
  ▸ ⓕ database={OracleDatabase@1799} "oracle Database"
  ▾ ⓕ clauses={ArrayList@1851} size=2
    ▾ ▦ 0={TokenizedClause@1854} "CREATE"
      ▸ ⓕ keyword="CREATE"
      ▾ ⓕ tokens={TokenStream@1876}""
        ▸ ⓕ database={OracleDatabase@1799}"oracle Database"
        ▸ ⓕ tokens={ArrayList@1878} size=0
    ▾ ▦ 1=[TokenizedClause@1855]"TABLE DATDBA.T_CUSTOMER(CUSTOMER_ID NUMBER(*,0) NOT NULL ENABLE, NAME
         VARCHAR2 (20 CHAR), ADDRESS DATDBA.CUST_ADDRESS_TYPE, CONSTRAINT PK_T_CUSTOMER PRIMARY KEY
         (CUSTOMER_ID)) STORAGE
      ▸ ⓕ keyword="TABLE"
      ▾ ⓕ tokens={TokenStream@1859}"DATDBA.T_CUSTOMER(CUSTOMER_ID NUMBER(*,0) NOT NULL ENABLE, NAME VARCHAR2 (20
         CHAR), ADDRESS DATDBA.CUST_ADDRESS_TYPE, CONSTRAINT PK_T_CUSTOMER PRIMARY KEY (CUSTOMER_ID))
         STORAGE (I
        ▸ ⓕ database={OracleDatabase@1799}"oracle Database"
        ▾ ⓕ tokens={ArrayList@1861} size=6
          ▸ ▦ 0={ObjectNameToken@1864} "DATDBA.T_CUSTOMER"
          ▸ ▦ 1={GroupedTokens@1865} "(CUSTOMER_ID NUMBER (*,0) NOT NULL ENABLE, NAME VARCHAR2 (20 CHAR), ADDRESS
                 DATDBA.CUST_ADDRESS_TYPE, CONSTRAINT PK_T_CUSTOMER PRIMARY KEY (CUSTOMER_ID))"
          ▸ ▦ 2={KeywordToken@1866} "STORAGE"
          ▸ ▦ 3={GroupedTokens@1867}"(INITIAL 65536 NEXT 1048576 MINEXTENTS 1 MAXEXTENTS 2147483645 PCTINCREASE 0
                 FREELISTS 1 FREELIST GROUPS 1 BUFFER_POOL DEFAULT FLASH_CACHE DEFAULT CELL_FLASH_CACHE DEFAULT)"
          ▸ ▦ 4={KeywordToken@1868} "TABLESPACE"
          ▸ ▦ 5={ObjectNameToken@1869} "USERS"
```

FIG. 15A

△ ▦ 0 = {ObjectNameToken@1864} "DATDB.T_CUSTOMER"

△ ▦ 1 = {GroupedTokens@1865} "CUSTOMER_ID NUMBER (*,0) NOT NULL ENABLE, NAME VARCHAR2 (20 CHAR), ADDRESS DATDBA.CUST_ADDRESS_TYPE, CONSTRAINT PK_T_CUSTOMER PRIMARY KEY (CUSTOMER_ID)"

△ ▦ 2 = {KeywordToken@1866} "STORAGE"

△ ▦ 3 = {GroupedTokens@1867} "(INITIAL 65536 NEXT 1048576 MINEXTENTS 1 MAXEXTENTS 2147483645 PCTINCREASE 0 FREELISTS 1 FREELIST GROUPS 1 BUFFER_POOL DEFAULT FLASH_CACHE DEFAULT CELL_FLASH_CACHE DEFAULT)"

△ ▦ 4 = {KeywordToken@1868} "TABLESPACE"

△ ▦ 5 = {ObjectNameToken@1869} "USERS"

FIG. 15C

```
tokenStream = {TokenStream@3122} "CUSTOMER_ID NUMBER(*, 0) NOT NULL ENABLE"
  database = {OracleDatabase@1799} "oracle Database"
  tokens = {ArrayList@3124} size = 6
    0 = {ObjectNameToken@3127} "CUSTOMER_ID"
    1 = {KeywordToken@3128} "NUMBER"
    2 = {GroupedTokens@3129} "(*, 0)"
    3 = {KeywordToken@3130} "NOT"
    4 = {KeywordToken@3131} "NULL"
    5 = {KeywordToken@3132} "ENABLE"
```

FIG. 16

CODE PACKAGER WITH SQL PARSER

CROSS-REFERENCE TO RELATED APPLICATION(S)

This application is a continuation of and claims a benefit of priority under 35 U.S.C. 120 of the filing date of U.S. patent application Ser. No. 16/953,411, filed Nov. 20, 2020, issued as U.S. Pat. No. 11,494,349, entitled "CODE PACKAGER WITH SQL PARSER," which claims a benefit of priority under 35 U.S.C. § 119(e) from U.S. Provisional Application No. 62/939,395, filed Nov. 22, 2019, entitled "CODE PACKAGER WITH SQL PARSER," the entire contents of which are hereby expressly incorporated by reference for all purposes.

TECHNICAL FIELD

This disclosure relates generally to management of computer systems. More particularly, some embodiments relate to management database systems. Even more particularly, some embodiments disclosed herein relate to a system, method, and computer program product for database change management.

BACKGROUND

Delivering new software experiences to market often involves not only deploying new application code, but also updating database schema and database logic to support the application code. While a variety of tools have been developed to with goal of streamlining application code delivery, many organizations still rely on a shared service database team that manually reviews and deploys DB code changes. Traditionally, database code and application code have been tracked and managed using separate systems. This leads to redundant effort, lack of visibility, confusion, and the possibility that application and database code will also begin to drift apart on the separate systems, leading to misalignment errors. Given that the end-user experience is incomplete without the full software stack, which includes both the application and the database, there is a need for continuous integration (CI) and delivery to bring the similar integration and deployment best practices to database changes as applied to application code changes and enable database code (e.g., SQL) code to flow through the software release pipeline, synchronized with application code.

SUMMARY OF THE DISCLOSURE

Embodiments disclosed herein provide a system, method, and computer program product for database change management. A database change management system, in accordance with some embodiments, can include a processor and a non-transitory computer readable medium storing computer executable instructions executable to provide a set of services including: a packaging service configured: to retrieve SQL scripts from a source code manager repository, the SQL scripts configured for a packaging job for a project, the package job relating to a set of changes to a database; package the SQL scripts as changes based on a configuration for the project by generating changesets pointing to corresponding SQL scripts; generate change objects by parsing the SQL scripts; generate a forecast report by applying changes in the change objects to a reference database, wherein the forecast report is indicative of a prediction of a failure or success of an implementation of the set of changes to the reference database; and responsive to a predicted implementation success, deploy the set of changes to the reference database.

According to some embodiments, a method for database change management comprises, at a first computing device communicatively coupled to a database server: opening a connection from the first computing device to a database maintained by the database server according to a database schema; retrieving SQL scripts from a source code manager repository, the SQL scripts configured for a packaging job for a project, the package job relating to a set of changes to a database; packaging the SQL scripts as changes based on a configuration for the project by generating changesets pointing to corresponding SQL scripts; generating change objects by parsing the SQL scripts; generating a forecast report by applying changes in the change objects to a reference database, wherein the forecast report is indicative of a prediction of a failure or success of an implementation of the set of changes to the reference database; and responsive to a predicted implementation success, deploying the set of changes to the reference database.

In some embodiments, parsing the SQL scripts may include: stripping out SQL comments from the SQL script, substituting SQL properties of one or more attribute values, replacing package blocks with placeholders, splitting SQL text into individual blocks of SQL statements, tokenizing each of the blocks of SQL statements, and parsing the tokenized SQL statements into change objects.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 11 depicts an example of a processing SQL.

FIG. 12 depicts the processing SQL of FIG. 1 with a comment stripped.

FIGS. 13A-13B depict examples of a token stream.

FIGS. 15A-15C depict examples of tokenized statements.

FIG. 16 depicts one example of a token stream.

DETAILED DESCRIPTION

Figure 1:
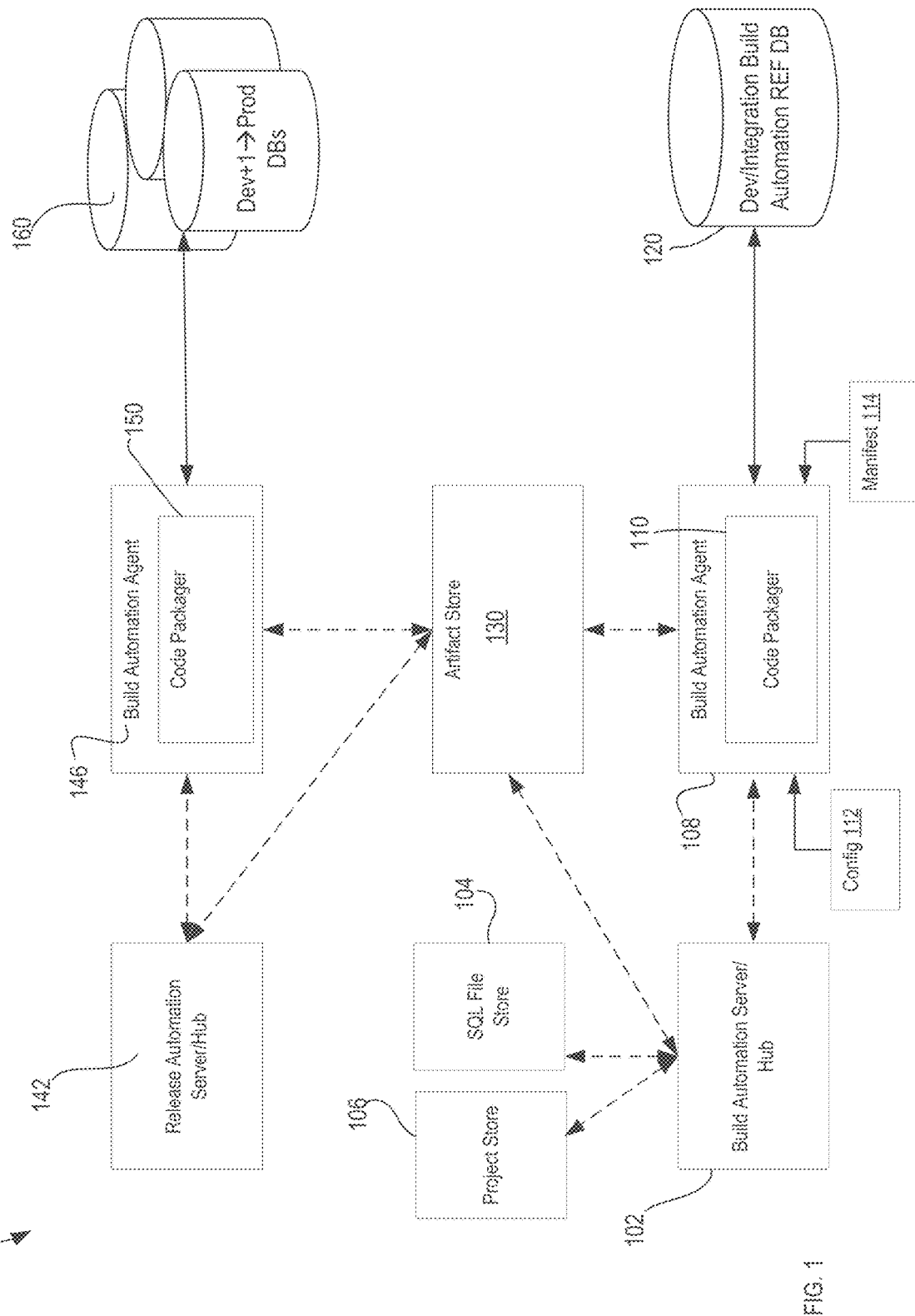
FIG. 1 is a diagrammatic representation of one embodiment of an architecture for packaging and deploying database changes.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As discussed above, delivering new software experiences to market often involves not only deploying new application code, but also updating database schema and database logic to support the application code. Given the need discussed above, there has been growing desire for continuous integration (CI) and delivery to bring the similar integration and deployment best practices to database changes as applied to application code changes and enable database code (e.g., SQL) code to flow through the software release pipeline, synchronized with application code. By aligning database deployments with application deployments, teams can bring new innovations to the market faster and with higher quality.

Traditionally, database code and application code have been tracked and managed using separate systems. This leads to redundant effort, lack of visibility, confusion, and the possibility that application and database code will also begin to drift apart on the separate systems, leading to misalignment errors. Database code changes should be tracked in the same source or version control system as application code. To this end code packager tools—such as the code packager by DATICAL, Inc. of Austin, TX—have been developed that allow teams to push database code into the source or version control solution that is already in place for application code. The code packager can produce an artifact from a database code that can flow through the software release pipeline, synchronized with application code.

In some implementations, the code packager integrates with source code control repositories to allow development teams to take advantage of the same branching and merging strategies established for their application code when managing their database changes. By including database change scripts in the same branch and merge commands performed for application code, the code packager ensures merged changes are available and promoted along with the application features they support.

The development of databases and database schemas to support application code is increasingly complex. Typically, database development and management involves running database instances in multiple environments. It is not uncommon, for example, to use three environments with potentially differing schema: a development environment; a quality assurance (QA) environment; and a production environment. The development environment is used in the authoring of the database structure. The QA environment allows for testing of the applications and enhancements that use the database. The production environment is the final database for general use. For example, the production environment may be a cloud computing system, an enterprise content management system or other system that makes use of the database.

Changes in a schema in a development environment may be migrated to the QA and production environments. At various times, the different environments may have different schema. Moreover, multiple instances of a database in the same environment may be using different versions of a schema depending on when the database was last updated. Conventionally, database changes have been tested and deployed by manually organizing and executing the SQL scripts against the target database instance. Building a new database or modifying an existing database may be dependent on hundreds of small scripts to build out new environments or evaluate existing ones. If a script is forgotten, if a script is run in the wrong order, or wrong version of the script is executed, the database can suffer serious data loss or an outage.

Conventional DB change management tools are insufficient, especially when pushing changes live in critical production environments. The present disclosure describes a database change management simulator and a dynamic rules engine that allow teams to simulate the impact of database changes before they are applied to ensure that the changes are in compliance with an organization's database standards. One embodiment of a database change management simulator/rules engine is described in U.S. Pat. No. 10,268,709, entitled "System, Method and Computer Program Product for Database Change Management," issued Apr. 23, 2019 (the "'709 Patent"), which is hereby fully incorporated herein by reference for all purposes. A database change management simulator/rules engine, such as provided by the simulation service or simulation engine of the '709 Patent, creates a virtual model (e.g., an object model) of a database, applies proposed changes to virtual model and applies rules to the results of the changes. The rules applied can model those that will be applied by an underlying database, user defined rules (e.g., organizational rules and policies) and other rules.

Simulating changes to a database may be performed based on a changelog of changes to be applied to the database. In some cases, the changelog is determined by taking a first snapshot of a database, applying SQL changes to the database, taking a second snapshot of the database, and comparing the first snapshot and second snapshot to determine the changelog/changesets. The changelog can then be used in simulating changes to the database for the application of rules.

It is therefore desirable for a code packager or other tool to automatically transform SQL scripts (or other database code) into change objects that can be used to simulate database changes. To this end, embodiments described herein provide mechanisms to parse SQL (or other database code) into change objects.

According to various embodiments, a packager simulates changes to a database using an in-memory model of the database (e.g., an in-memory model of the database schema). Database changes embodied in SQL are applied to the model to simulate changes. Example embodiments of using a simulation model to simulate changes and forecast the results of changes is described in the '709 Patent.

In some embodiments, database changes are represented by a database change log (or changelog) that specifies changes to the configurable elements or relationships of a database. The change log can include change sets (changesets). A changeset defines the changes to be made to a database and includes operations that are executed against the target database. A changeset includes one or more changes logically grouped together as a unit of change to a database. A changeset may be equivalent to one or more SQL statements, but represented in a database-neutral format. In other embodiments, a changeset can be specified in or include SQL or other query language statements. A changelog and changesets may be represented in a variety of formats including, but not limited to, XML, YAML or other formats.

Figure 9:
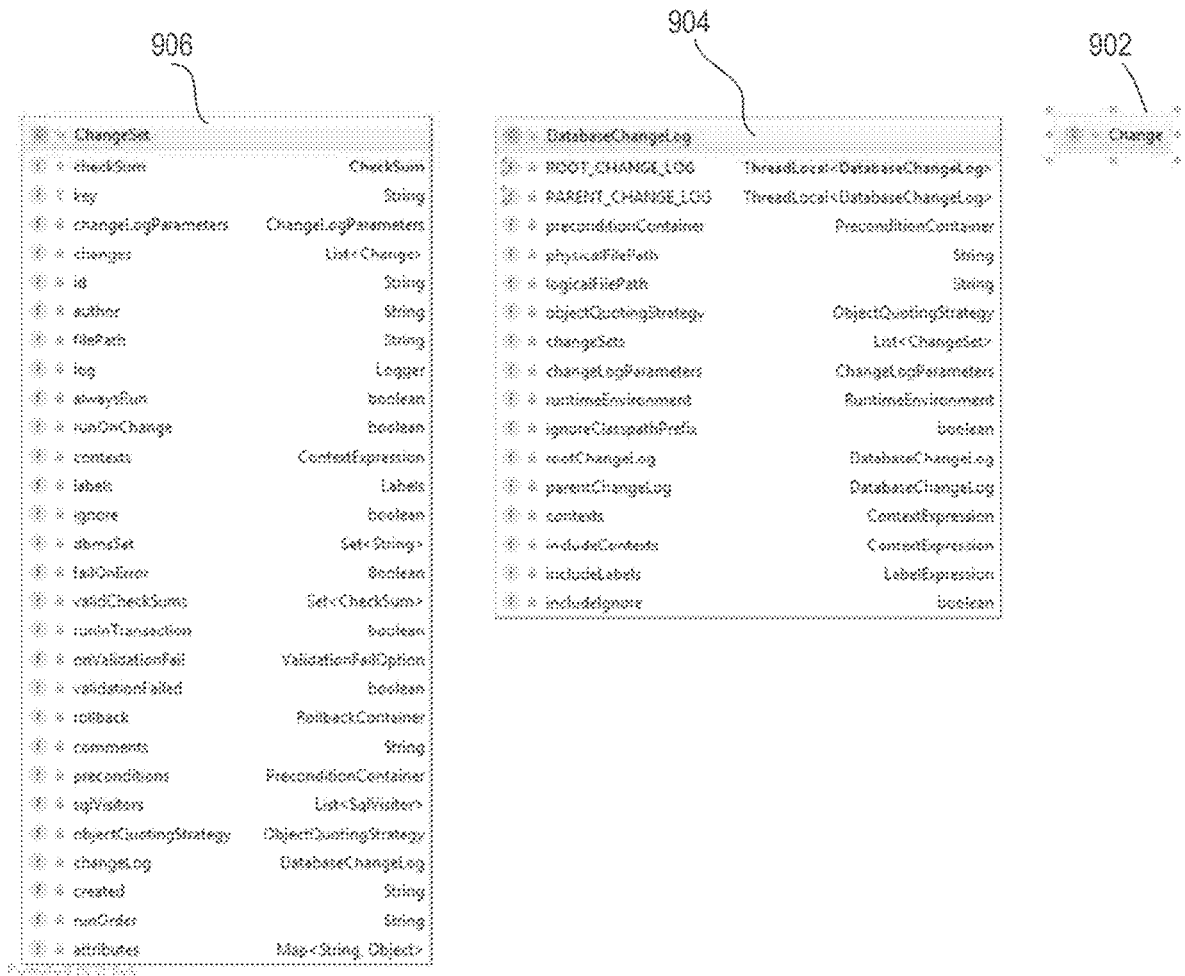
FIG. 9 depicts one embodiment of a change object model.

Changes may be represented in-memory according to an object model, an example of which is illustrated in FIG. 9. The example change of object model of FIG. 9 includes a change interface 902 object, a DatabaseChangeLog Class 904 and ChangeSet Class 906. A DatabaseChangeLog object represents a changelog, and associated ChangeSet objects comprise changesets of one or more database changes.

Embodiments herein include an SQL parser to parse SQL scripts into token streams and SQL readers to parse the token streams to create change objects (e.g., ChangeSet objects) from the SQL script. The SQL parser and SQL readers may thus form a change object generator. The changes represented by a ChangeSet object can be mapped to commands on an in-memory simulation model to simulate the changes to the database. Forecast rules are applied to determine the results of changes.

FIG. 1 is a diagrammatic representation of one embodiment of an architecture 100 for packaging and deploying database changes. In the embodiment illustrated, architecture 100 includes a development tier and a production tier, though additional tiers may be included.

The development tier includes a build automation server/hub 102, which may comprise a source code manager (SCM). Build automation server/hub 102 may be coupled to or manage an SQL store 104 that stores SQL scripts and a project store 106 which stores projects (in this context a project can refer to an application (i.e., application code and related files). The development tier also includes a build automation agent 108. Build automation agent 108, according to one embodiment, comprises a database change management code with a code packager 110. The code packager 110 includes a SQL parser and associated SQL readers.

In general, code packager 110 is provided with a deployment configuration that specifies options to use during packaging. Configuration 112 can specify for example, information about source code management repositories where SQL scripts and projects reside (e.g., information about SQL store 104 and project store 106). In another embodiment, the configuration for code packager 110 may be provided as a manifest 114, which identifies the SQL scripts to be processed and provides metadata about the scripts.

During processing, the code packager 110 retrieves the appropriate SQL scripts from the SCM of the build automation server/hub 102 and implements a workflow to deploy changes to a reference a database 120. If database 120 can be updated without error, code packager 110 creates an artifact embodying the changes to the database and stores the artifact in an artifact store 130. A release/automation server/hub 142 calls a build automation agent 146, which comprises a code packager 150, to pick up the artifact and process the changes in the artifact to update a database 160 (e.g., a production database or other database).

Figure 2:
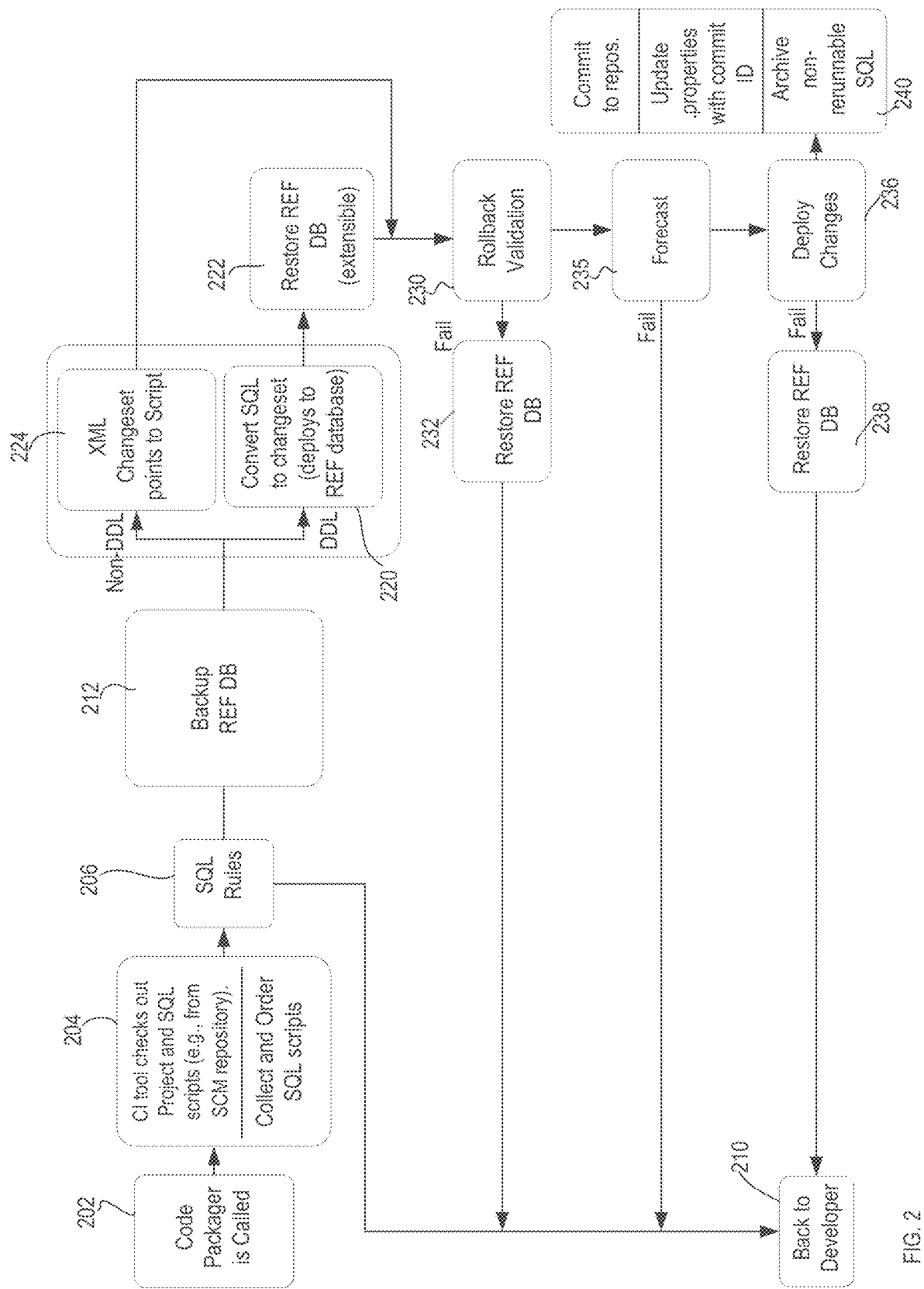
FIG. 2 is a representation of a workflow implemented by a packager.

One embodiment of a workflow implemented by a packager (e.g., code packager 110) is illustrated in FIG. 2. At step 202 the code packager is called to perform a packaging job. At 204, the code packager retrieves the project and SQL scripts (e.g., from an SCM repository) specified in a configuration for the packaging job. For example, the code packager can check out a project from the project store 106 (e.g., a project) and scripts from SQL store 104 (e.g., an SQL SCM). The code packager determines the list of scripts to package. For example, this can be determined by what changes have been introduced to the SQL SCM since last successful packaging job for the project (If this is the first packaging job then all scripts will be packaged).

At step 206, the code packager checks the SQL scripts to be packaged for rules compliance. If the scripts fail to pass the rules applied at step 206, the scripts are returned to the developer (step 210). For example, the packaging job fails, and a notification is provided to the developer. At step 212, the packager backups the reference database against which it will execute the changes. For example, referring to FIG. 1, packager 110 backs up REF database 120.

Figure 4:
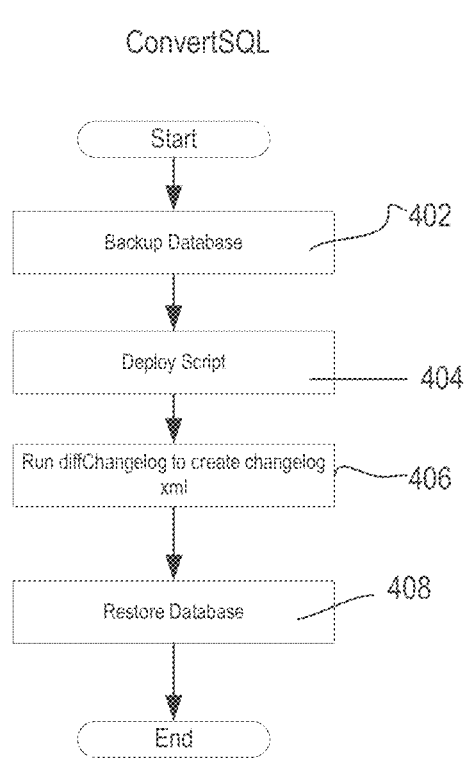
FIG. 4 is a flow chart illustrating one embodiment of a convert process.

If the SQL scripts pass the SQL rules applied at step 206, the SQL scripts can be packaged as changes according to a convert method (step 220) or a packager native method (step 224), based, for example, on the configuration for the project, the placement of the script in a particular location or other factors. For scripts that use a convert method, the scripts are converted to changesets (step 220). According to one embodiment, this may comprise: taking a first snapshot ("snapshot1") of the existing schema of the reference database (e.g., the schema of REF database 120), applying the scripts to the reference database, taking a second snapshot of the database schema ("snapshot2"), comparing snapshot1 and snapshot2, and generating a changelog (e.g., an XML changelog) based on the results of the comparison. The changelog is stored as a changelog file. The changelog can be used to instantiate objects according to a change object model (e.g., a DatabaseChangeLog object and ChangeSet objects) during forecasting (described below). At step 222, the packager restores the reference database (e.g., using the backup created at 212). One embodiment of a convert method (step 220) is illustrated in FIG. 4 (described below).

According to a packager native process, an XML changelog (or other changelog) is generated in which the each changeset points to a corresponding SQL script (e.g., of the scripts collected and ordered at step 204) (step 224). At the forecasting step, the SQL scripts are parsed to generate the change objects (e.g., changeset objects) used in forecasting.

If the SQL scripts include rollbacks, the packager runs the SQL scripts against the reference database and executes the rollbacks (step 230). If rollback does not occur properly, the packager restores the reference database from the backup (step 232), and the scripts are returned to the developer (step 210). For example, if the packaging job fails, a notification is provided to the developer. If rollback is successful, the packager proceeds to forecasting (step 235).

At step 235, the packager implements forecasting. According to one embodiment, the packager is provided with or collects a snapshot and profile data of the target database (e.g., REF database 120). For example, the packager can query the current state of a managed database schema, if not already known, and output a representation of the schema. As would be understood by those of ordinary skill in the art, a database server can provide a listing of database schema objects in response to one or more quarries. Thus, by querying a database, the packager can determine, for example, the tables, columns, constraints and other schema objects to produce a snapshot of a database. The schema objects provided in the snapshot can be mapped to a model of the schema.

The snapshot can be augmented with any other data that might impact the application of changes. According to one embodiment, for example, the packager may connect to a managed database, read information from the schema as well as summary information about data stored, and record profile information or other data. Examples of information that may be provided include, but are not limited to, row counts of data tables, database engine parameters such as buffer sizes, memory allocation, file system implementations, table types, permission models (which users have permission to change which structures). The packager may also test database performance by recording the time it takes to perform database operations. The packager can thus collect a schema snapshot and light-weight data profile (e.g., row counts and permission model) of a database useful for forecasting the performance of database changes. As described in the '709 Patent, such information can be used to build a baseline simulation model of the target database.

The packager creates a change object model from a changelog generated from the convert process (step 220) or parses the SQL scripts referenced by the changesets generated in the packager native process (step 224) to generate the objects. The changes in the change objects are applied to an in-memory model of the database (e.g., a simulation model) to simulate the changes to the database. The packager can apply rules configured to ensure that proposed database code changes are safe and in compliance with an organization's database standards. Forecasting can enable application developers with a self-service validation capability that uses the same automated build process established for the application. Instant feedback can be delivered to developers on changes that violate rules, while database changes that pass the rules can be propagated to the target environment.

According to one embodiment, the packager ends the job if unrecoverable errors (or other predefined errors) are identified when simulating the changes. Otherwise, the packager can notify the developer of recoverable errors. The packager also determines the impact of changes to the database. For example, the packager can use row counts or other information to predict long-running operations and operations which destroy or alter large amounts of data. The row counts coupled with database engine parameters, table types and database performance metrics allow the packager to predict the time it takes to perform the proposed changes represented by a changelog. The row counts combined with the changes, in some cases, can be sufficient to warn the user about amount of data altered or destroyed. A forecast report can be produced that contains information about the success of proposed changes, the impact of the proposed changes and other information.

If there are no errors in the forecast that would prevent deployment, the packager deploys the changes to the reference database (step 236). If deployment fails, the packager restores the reference database from the backup (step 238) and the scripts are returned to the developer (step 210). For example, upon a failed deployment, the packaging job ends and a notification is sent to the developer. At step 240, the packager moves non-rerunnable SQL Files to the archive and commits changes to SCM repositories.

Returning briefly to FIG. 1, if deployment of changes to database 120 is successful, the project with associated database changes can be stored in the artifact store 130 for deployment to the next tier. In the example of FIG. 1, the changes can be processed to update databases 160.

Figure 3A:
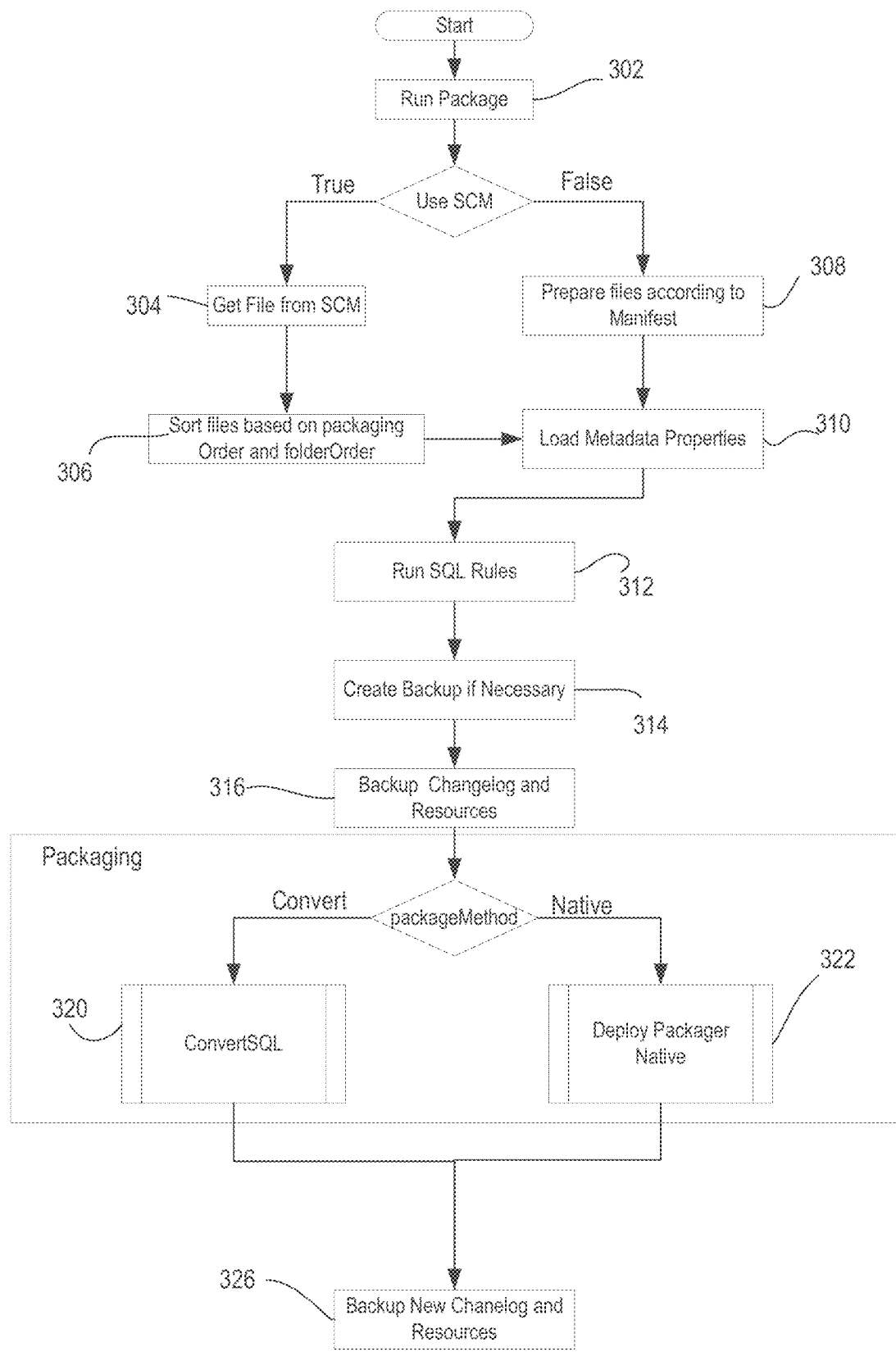
FIGS. 3A-3B are diagrammatic representations of one embodiment of processing by a code packager.
Figure 3B:
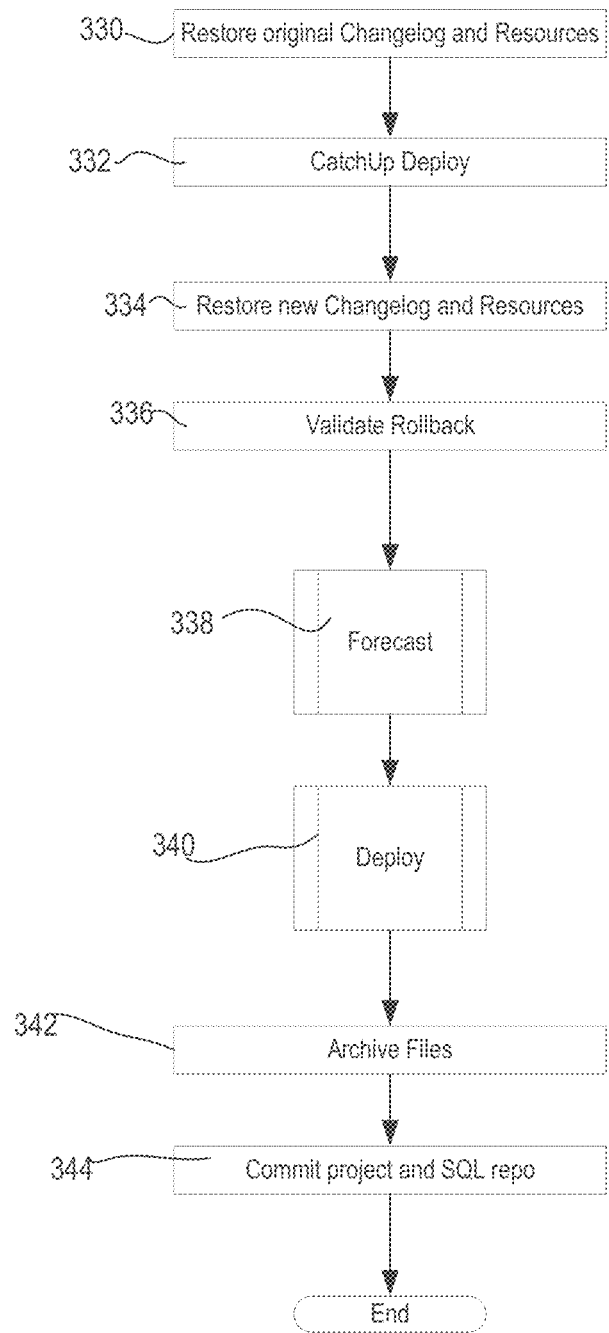

FIG. 3A and FIG. 3B are diagrammatic representations of one embodiment of processing by a code packager, such as code packager 110. At step 302, the packager is called to run a package (perform a packaging job). In one embodiment a packager configuration is provided (e.g., a deployPackager-.properties file in a top level of a project directory) that specifies a variety of information used to interact with SCM solutions and to perform database backups and validations. In such an embodiment, the packager retrieves the properties file from the SCM (step 304), determines the SQL files to be packaged, and sorts the SQL files based on packaging order and folder order (step 306). In another embodiment, a manifest file specifies SQL scripts to be processed, and the packager accesses SQL files according to the manifest (step 308). The packager loads metadata properties for the SQL files (step 310) (e.g., from the manifest file, metadata, properties file, or other sources).

At step 312, the packager runs any desired SQL Rules. If the SQL to be packaged passes the SQL rules, the packaging proceeds. Otherwise, the project can be returned to the developer for correction. For example, if the packaging job fails, a notification is provided to the developer.

At step 314, the packager creates a backup of a target database (e.g., REF database 120). The packager can also backup a changelog of previous changes to the database, configurations, and other resources associated with the project (step 316).

Figure 5:
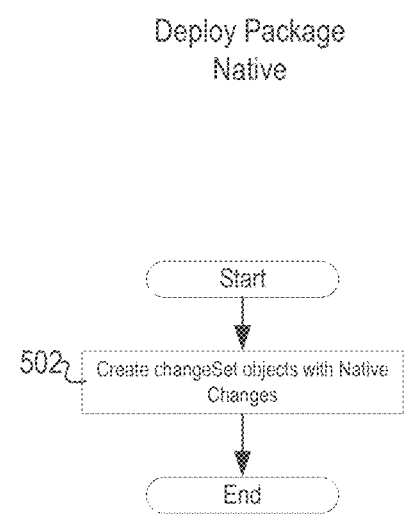
FIG. 5 is a flow chart illustrating one embodiment of a packager native process.

In some embodiments, the metadata properties specify a packaging method. In the example of FIG. 3A, SQL file can be packaged according to a convert process (ConvertSQL) or a packager native process. Thus, depending on the selected packaging method, the code packager packages the SQL scripts using the ConvertSQL process (step 320) or packager native process (step 322). One embodiment of a convert process (step 320) is illustrated in FIG. 4. One embodiment of a packager native process (step 322) is illustrated in FIG. 5.

Packaging via steps 320 or 322 results in a new changelog (e.g., an XML changelog) of changes to run against a target database (e.g. REF database 120). Depending on the packaging method used, the changeset may specify the changes to be made or point to the SQL scripts to be executed. At step 326, a backup of the new changelog and resources is created. In this context, the resources are SQL scripts external to the changelog (e.g., external to a file in which the changelog is embodied). The resources can contain any valid SQL. By way of example, but not limitation, resources typically contain data modification language statements (inserts, deletes, updates) and the definitions of functions, procedures, packages, triggers and/or views.

Referring to FIG. 3B, the original changelog and resources (e.g., backed up at step 316) are restored (step 330) and a catchup deploy is performed (step 332) on the target database to ensure that the target database to which the changes are to be deployed is caught up to the state of the database when packaging began. The new changelog and resources (backed up at step 326) are then restored (step 334).

Figure 6:
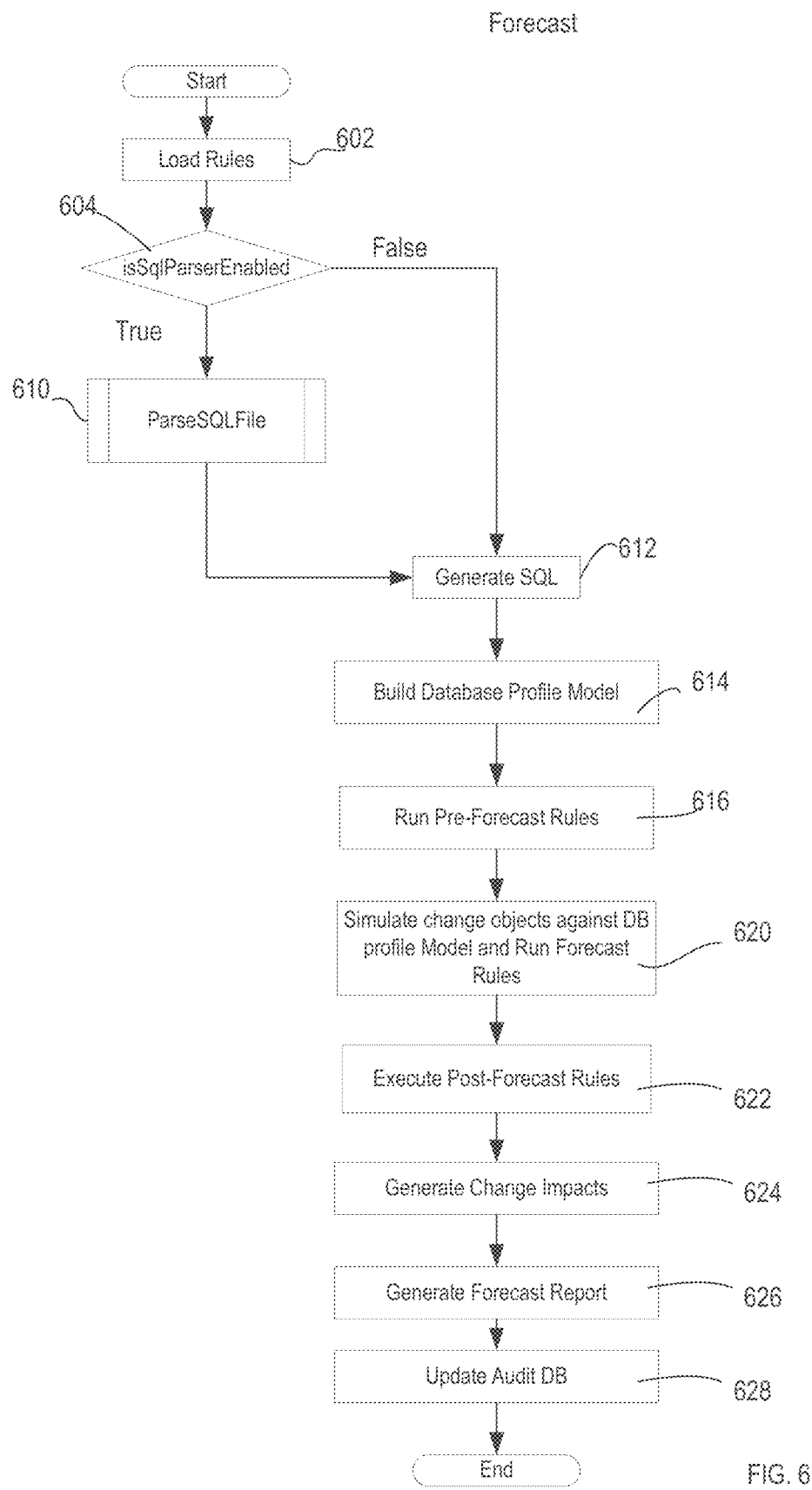
FIG. 6 is a flow chart illustrating one embodiment of a method for forecasting.

At step 336, the SQL scripts and rollbacks can be performed to validate rollback. If rollback fails, the packager restores the target database from the backup (e.g., backed up at step 314 or step 402), and the scripts are returned to the developer. For example, the packaging job fails, and a notification is provided to the developer. If rollback is successful, the packager proceeds to a forecast process (step 338). According to one embodiment, forecasting includes applying changes from the new changelog to an in-memory model of the target database to determine errors and/or generate forecast reports as described, for example, in the '709 Patent. FIG. 6 illustrates one embodiment of forecasting.

Figure 8:
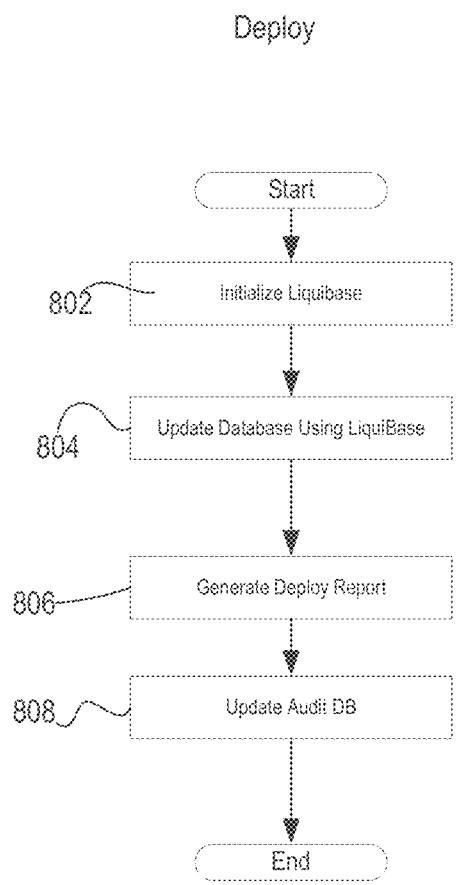
FIG. 8 is a flow chart illustrating one embodiment of a deployment method using Liquibase.

At step 340, the changes can be deployed to the target database. Deployment may be dependent on a successful forecast. One embodiment of deployment is illustrated in FIG. 8. If deployment is successful, the files can be archived (step 342) and the project and SQL files committed to the repositories (step 344). FIG. 3A-3B is provided as a non-limiting example of processing by a code packager. Steps may be repeated as needed or desired, additional steps performed, alternative steps performed, steps omitted, or steps performed in different orders.

FIG. 4 illustrates one embodiment of a convert method (e.g., one embodiment of a ConvertSQL process). In the convert method, a backup of the target database is created (step 402) and the SQL scripts are run on the target database (step 404). The schema of the database after the SQL scripts are run is compared to the schema of the database prior to running the scripts to determine the differences between database and generate a changelog (e.g., an XML changelog) of the database changes (step 406). According to one embodiment, the packager may use the diffChangelog ("Diff") command provided by LIQUIBASE by DATICAL of Austin, TX to compare the target database after the scripts have been run to a backup of the database prior to the scripts having been run as the base database. The differences can be stored as a changelog (e.g., an XML changelog). At step 408, the target database is restored (e.g., based on the backup created at step 402). FIG. 4 is provided as a non-limiting example of a convert method. Steps may be repeated as needed or desired, additional steps performed, alternative steps performed, steps omitted, or steps performed in different orders.

FIG. 5 is a flow chart illustrating one embodiment of a packager native process. In the packager native process, a change set is created (e.g., in XML) for an SQL script, where the changeset points to a corresponding SQL script (step 502). Step 502 can be repeated for each script to be packaged to create a changelog of changesets. FIG. 5 is provided as a non-limiting example of a packager native method.

FIG. 6 is a flow chart illustrating one embodiment of a method for forecasting. At step 602, a set of rules are loaded. The rules may model the rules applied by the underlying database, user defined rules, permissions and other rules. The rules can be configured to ensure that proposed database code changes are safe and in compliance with an organization's database standards. Forecasting can enable application developers with a self-service validation capability that uses the same automated build process established for the application. Instant feedback can be delivered to developers on changes that violate rules, while database changes that pass the rules can be propagated to the target environment.

Figure 7:
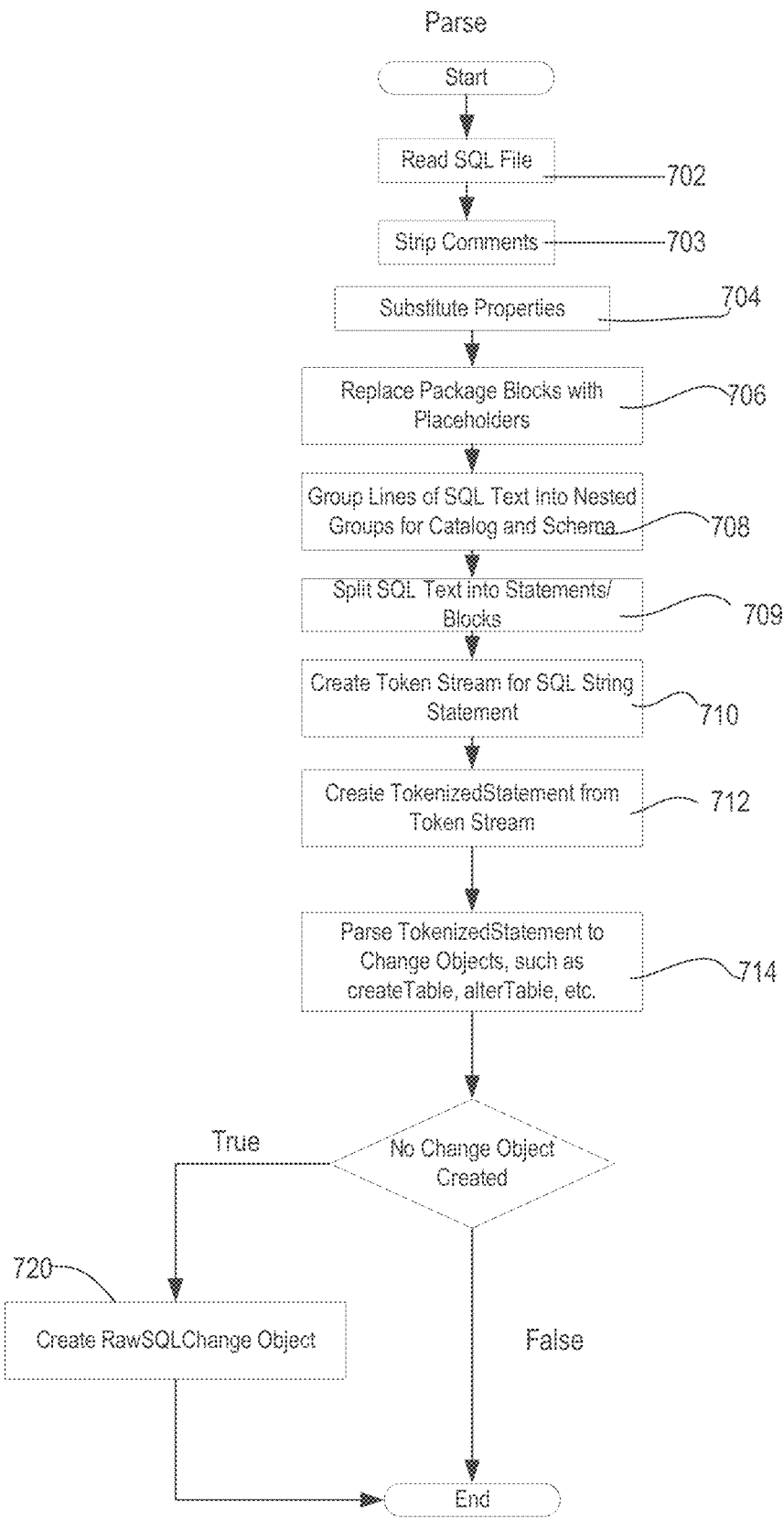
FIG. 7 is a flow chart illustrating one embodiment of parsing a SQL file.

According to one embodiment, the packager includes a SQL parser and SQL readers. At step 604, the packager determines if the SQL parser is enabled. In some embodiments the SQL parser is enabled for a project as a whole in the configuration for the parser. The SQL Parser and SQL readers are used to process a changelog of changesets that point to SQL scripts (e.g., changesets created at 224, 320, 502) to create objects according to the change object model (e.g., DatabaseChangeaLog and changeSet objects) (step 610). FIG. 7 (described below) illustrates one embodiment of parsing a SQL file. The result of processing by the SQL parser and SQL readers is change objects that model the changes to be applied to the database. In some embodiments, the change objects generated by the SQL readers are in-memory objects that are not persisted. One embodiment of a change object model is illustrated by change object model of FIG. 9.

At step 612, the packager runs a generate SQL method to get the SQL from the SQL files that resulted in each change or generates SQL from the change objects. The SQL can be kept in memory for reporting purposes.

At step 614, a profile model (baseline simulation model) is built or provided to the packager where the baseline models a current state of the target database schema. Example embodiments of building or providing a baseline model are discussed in the '709 Patent. According to one embodiment, the packager is provided with or collects a snapshot and profile data of the target database (e.g., REF database 120). According to one embodiment, the packager can query the current state of a managed database schema, if not already known, and output a representation of the schema. As would be understood by those of ordinary skill in the art, a database server can provide a listing of database schema objects in response to one or more quarries. Thus, by querying a database, the packager can determine, for example, the tables, columns, constraints and other schema objects to produce a snapshot of a database. The schema objects provided in the snapshot can be mapped to a model of the schema.

The snapshot can be augmented with any other data that might impact the application of changes. According to one embodiment, for example, the packager may connect to a managed database, read information from the schema as well as summary information about data stored and record profile information or other data store. Examples of information that may be provided include, but are not limited to, row counts of data tables, database engine parameters such as buffer sizes, memory allocation, file system implementations, table types, permission models (which users have permission to change which structures). The packager may also test database performance by recording the time it takes to perform database operations. The packager can thus collect a schema snapshot and light-weight data profile (e.g., row counts and permission model) of a database useful for forecasting the performance of database changes.

At step 616, the packager runs pre-forecast rules. At step 620, the packager simulates changes to the in-memory model of the database using the change objects of the change object model. To simulate changes the packager creates the change objects an XML changelog (e.g., an XML changelog created at step 220, 406) or uses the change objects created by the SQL Readers at 620 and applies the changes represented by the change objects to the in-memory simulation model. The changes represented by the change objects may be mapped to commands against the simulation model, which the packager executes to manipulate internal data to simulate the changes to database schema. The packager can apply forecast rules while running the simulation. At step 622, the packager applies post-forecast rules.

Thus, through pre-forecast, forecast, and post-forecast rules, the packager can determine if a change violates rules including permission rules (e.g., as determined by a permission model from profile information), rules that model those applied by the underlying database, or rules to ensure that the changes do not violate an organization's database rules. The packager can log warnings or errors associated with the changes that caused them and the context of the error including the state of the model at the time.

If errors are encountered, they may be recorded and/or reported to the developer. In some implementations, errors may be recorded/reported, but the simulation continued to update the simulation model. In some embodiments, the packager may record/report the error and process the next change without manipulating the model for the change that caused the error. In some embodiments, the simulation can stop when an error is encountered, or other criteria met. Whether the simulation is stopped or the model updated to reflect a change in light of an error can be a matter of configuration and may depend on the type of change and error encountered. It can be further noted that, in some embodiments, the SQL parser may indicate that it could not parse a SQL script or particular statements within the script. When the packager encounters such an indication from the SQL parser, the packager can send a notification to the developer.

At step 624, the packager can generate change impacts (step 624). For example, the packager can use row counts or other information to predict long-running operations and operations which destroy or alter large amounts of data. The row counts coupled with database engine parameters, table types and database performance metrics allow the packager to predict the time it takes to perform the proposed changes represented by a changelog. The row counts combined with the changes, in some cases, can be sufficient to warn the user about amount of data altered or destroyed.

At step 626, a forecast report is produced that contains information about the success of proposed changes, the impact of the proposed changes and other information. The forecast report can include, for example, performance descriptions, such as number of rows viewed, number of values viewed, number of rows deleted, indices rebuilt, and suggestions for schema changes, such as adding an index on a foreign key that does not yet have an index. The forecast report may also include the SQL that resulted in or was generated for each change (e.g., at step 612).

At step 628, an audit database is updated. For example, the audit database may be updated with:
 a detailed report of the changes deployed;
 runtime data: deployment operation duration, person or automation agent and system from which the operation was initiated;
 results of any rules validation; and
 salient messages from the database during the update.

FIG. 6 is provided a non-limiting example of forecasting. Steps may be repeated as needed or desired, steps omitted, additional or alternative steps performed, or steps performed in other orders.

A packager may include a SQL parser and associated SQL readers to parse SQL scripts and create change objects from the SQL script. FIG. 7 is a flow chart illustrating one embodiment for a SQL parser and associated SQL readers. According to one embodiment, the SQL parser does not validate SQL statements. Instead, in this embodiment, the SQL parser parses provided SQL scripts and models them into an object model for subsequent validation with rules and forecast. One non-limiting example of a processing SQL is discussed in conjunction with the exemplary SQL of FIG. 11.

The SQL parser can process the changelog for a project (e.g., generated by the packager native process) which includes changesets that point to SQL scripts. At step 702, a SQL file referenced by a changeset is accessed. In the event the SQL parser is unable to parse the provided SQL script file or encounters other predefined errors, the SQL parser can generate an indication that it could not parse the SQL Script file. For example, the SQL parser writes a message to a log file that indicates the SQL file could not be parsed and parsing of the SQL file is skipped/aborted. The forecast report (e.g., generated at 626) can include a warning notifying the developer that the SQL parser could not read the script file or encountered another error.

There may be certain statements that the SQL parser cannot parse. When a SQL statement cannot be parsed, the SQL parser writes a message to the log file that indicates the SQL statement could not be parsed and parsing of the SQL statement is skipped/aborted. In the event the SQL parser is unable to parse a statement, the forecast report may include a warning for the statements that cannot be parsed. In some embodiments, the SQL parser will continue parsing the provided SQL script and attempt to parse all other statements.

A SQL script may include SQL comments. At step 703, the SQL parser can strip out the SQL comments, since the comments will not impact the structure of the database. Thus, for example, comment 1102 in FIG. 11 can be stripped to create the SQL of FIG. 12.

An SQL script may include, in some embodiments, SQL properties specified for substitution using a known pattern, such as ${property_key}. The changelog for the project or metadata for the project contains values for the property that would be substituted before the script is executed against underlying database. Property substitution can be used for any attribute value in the changelog but is particularly useful to handle differences in the following across environments: schema and catalog names, numeric configuration values for sequences, and tablespace definitions for tables and indexes. At step 704, the SQL parsers substitutes the properties in the SQL file that would be substituted when executing the SQL script against the target database. In some embodiments, a substitution routine can look at the respective database and determines what the appropriate values should be based on context and labels.

At step 706, the SQL parser replaces package blocks with placeholders. For example, ORACLE SQL packages are blocks of SQL which can have nested blocks of SQL code that have nested SQL blocks such as functions and procedures. According to one embodiment, the SQL parser represents a package and package body a whole, and the nested objects in a package are not parsed into their own Change Objects. According to one embodiment, the SQL text is matched against a package and package body patterns and are replaced with distinct placeholder texts which will later be replaced with original content as RawSQLChange objects, which are Liquibase change objects with raw sql contents.

At step 708, the SQL parser assigns the database schema and catalog to each of the statements or blocks. Put another way, the SQL parser groups the lines of SQL text into nested groups for catalog and schema based on the use of the statements that set the catalog or schema for the session. The SQL file may not have database schema and catalog information in the SQL file itself. Instead, in some embodiments, the users may provide schema and catalog information in a metadata properties file for a project.

At step 709, the SQL file is broken down into individual statements or blocks of statements. Each block represents a unit of change that is transformed into a corresponding change object (changeset object). In other words, each change object (changeset object) represents one unit of change, though a unit of change may include multiple SQL statements. In some embodiments, the SQL file may delineate the change units (blocks of SQL statements) using a special character or other delimiter, where the SQL parser parses each block into a changeset.

According to one embodiment, the SQL parser splits the SQL text in each group into individual/block statements by going line by line against the SQL text and matching for the pattern in the following exemplary order: 1) Packages; 2) SQL Blocks (procedures, functions, anonymous blocks) delimited by block delimiters (e.g., "/" or "GO" or other defined delimiter); 3) Split statements based on SQL lines that set Catalog/Schema; 4) Split individual statements based on statement delimiters (e.g., ";" or other defined delimiter).

For example, the SQL of FIG. 12 can be broken into three statements: create table, comment on, and create index as illustrated in Table 1, below:

TABLE 1

| 1 | CREATE TABLE "DATDBA". "T_CUSTOMER" ("CUSTOMER_ID" NUMBER(*, 0) NOT NULL ENABLE, "NAME" VARCHAR2(20 CHAR), "ADDRESS" "DATDBA". "CUST_ADDRESS_TYPE", CONSTRAINT "PK_T_CUSTOMER" PRIMARY KEY ("CUSTOMER_ID")) STORAGE(INITIAL 65536 NEXT 1048576 MINEXTENTS 1 MAXEXTENTS 2147483645 PCTINCREASE 0 FREELISTS 1 FREELIST GROUPS 1 BUFFER_POOL DEFAULT_FLASH_CACHE_DEFAULT CELL_FLASH_CACHE_DEFAULT) TABLESPACE "USERS"; |
|---|---|
| 2 | COMMENT ON COLUMN "DATDBA". "T_CUSTOMER". "NAME" IS 'Name column can contain First and Middle name. Surname must be in different column.'; |
| 3 | CREATE INDEX "DATDBA". "I_NAME" ON "DATDBA". "T_CUSTOMER" ("NAME") TABLESPACE "USERS"; |

Figure 10:
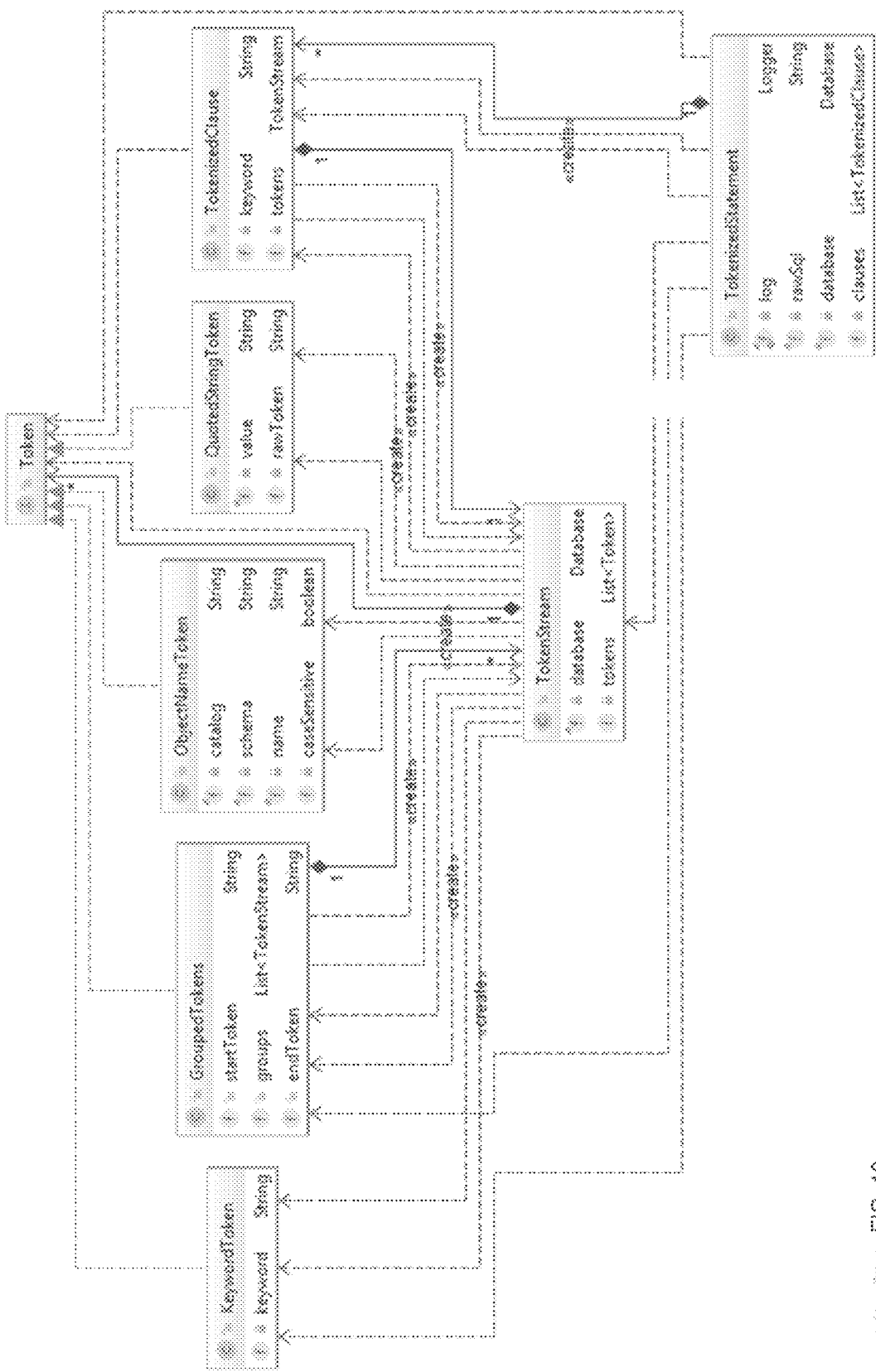
FIG. 10 is a diagrammatic representation of one embodiment of an object model for tokenization.

At step 710, the SQL parser tokenizes SQL statements into a token stream. Tokenizing includes breaking the characters into a sequence of tokens (strings with an assigned and thus identified meaning). A tokenized statement is created from the token stream (step 712). For additional context, FIG. 10 is a diagrammatic representation of one embodiment of an object model for tokenization. In the embodiment of FIG. 10, the SQL text is broken into tokens including a keyword tokens, composed group tokens, object name tokens and quoted string tokens.

Keyword tokens are assigned to defined keywords identified in the SQL text. Composed group tokens, which includes multiple tokens represent groups of tokens. For example, words within parenthesis in a statement may be grouped using a composed group token. Object name tokens are assigned to database object names identified in the SQL text. Quoted string tokens are assigned to quoted strings in the SQL text. For example, the create index statement of Table 1 can be represented by the TokenStream illustrated in FIG. 13A (also illustrated in FIG. 13B).

The SQL parser passes the token stream for a statement to SQL readers that parse the token streams into changes (change objects) (step 714). More particularly, a token stream is passed to different SQL readers, which each have logic to create change objects based on tokenized statements. Multiple readers may work on the same tokenized statement and may create multiple change objects from the same statement. According to one embodiment, the readers create change objects from the tokenized clauses referenced by the tokenized statement.

According to one embodiment, the token stream is passed to SQL reader objects (SqlReader objects). SqlReader is an interface and it is implemented by many SQL readers. According to one embodiment, SQL readers are implemented per change types (e.g., per liquibase change type), for example: CreateTableSqlReader, CreateIndexSqlReader, etc. Readers can also be implemented differently for different databases as well. For example, AddNotNullConstraintSqlReaderPostgreSQL will parse only if the database is Postgres, whereas, AddNotNullConstraintSqlReader will parse for other databases.

The SqlReader classes, in one embodiment, have two arguments to their constructor: keywords, and stopKeywords. The "keywords" argument takes array of keywords that should be present in the token in the given order for the reader to work on the stream and parse it into a change. The "stopKeywords" argument takes an array of string which will short-circuit and prevent this reader from parsing the token stream if any of those keywords are present in the token stream in any order. Thus, a reader can be configured with arrays of keywords and stop keywords.

According to one embodiment, the token stream is passed to all the SqlReaders available. The SqlReader first creates a tokenized statement (e.g., a TokenizedStatement according to FIG. 10) from the token stream. A tokenized statement is a chain of tokenized clauses (e.g., a chain of TokenizedClause objects). A tokenized clause is a structure, which is formed by making a head out of the "keyword" for the SqlReader (e.g., a "keyword" from the keyword array) and linking the rest of the tokens that follows from the token stream until another "keyword" is found. The next "keyword" makes the head of the next tokenized clause and the tokens that follow make up its body and so on. Thus, a tokenized statement is created based on the SqlReader that is processing the token stream. The tokenized statement has pointers to the "keywords" making it easy to traverse through the statements using these keywords.

Figure 14:
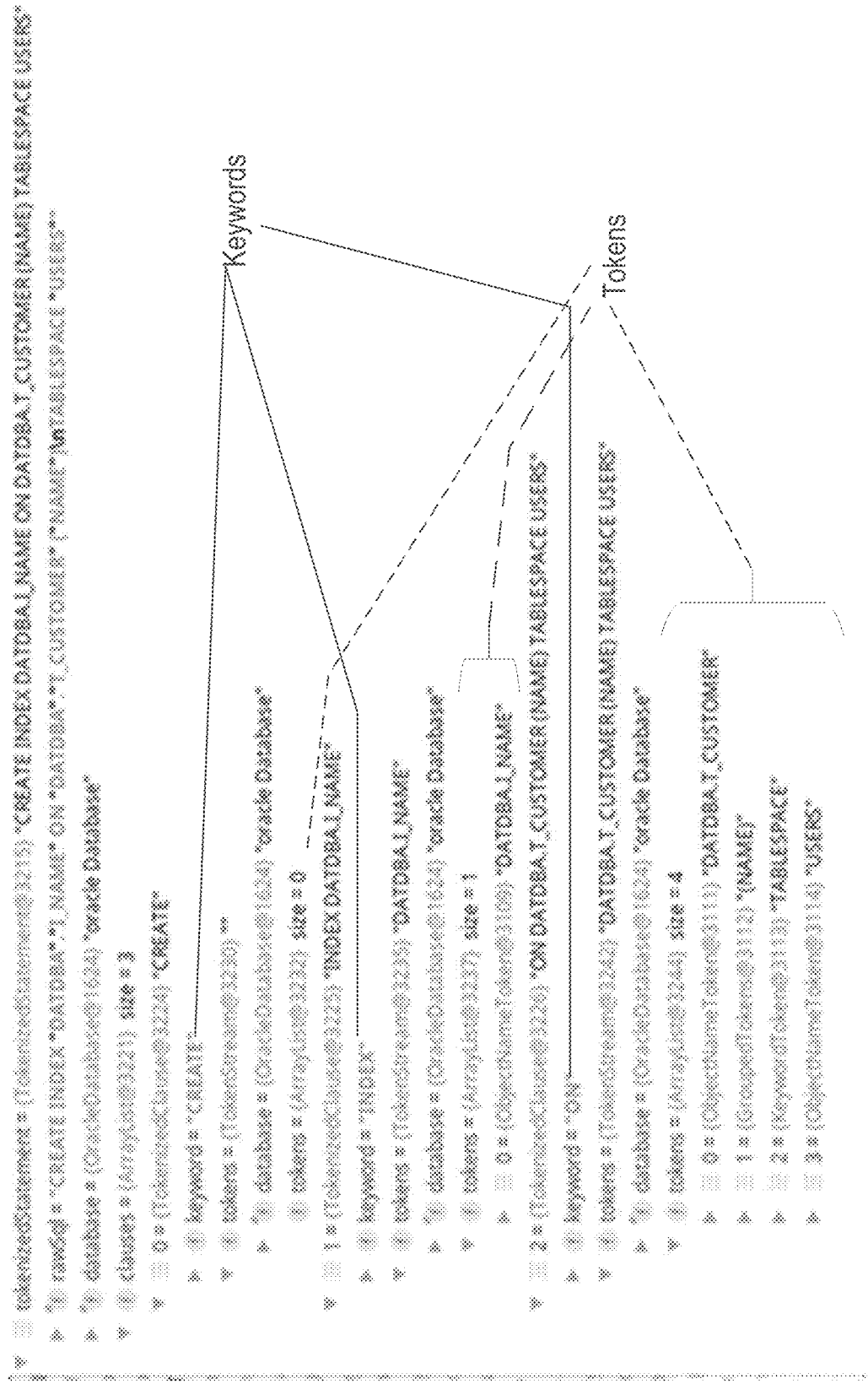
FIG. 14 depicts an example of a tokenized statement.
Figure 15B:
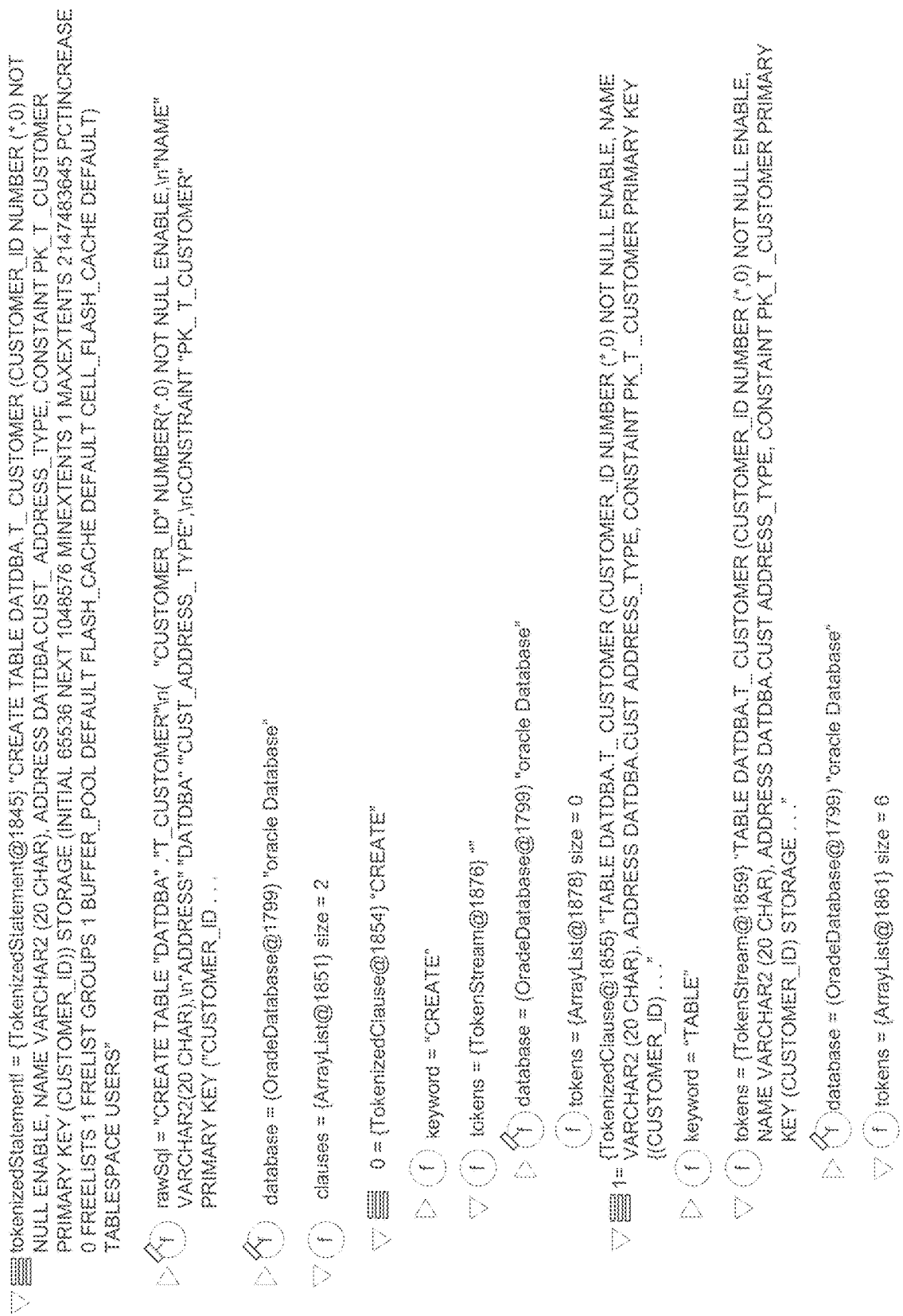

For example, a CreateIndexSqlReader may be configured with the keywords "create" "index" "on". Thus, the token stream created from the "create index" statement of Table 1—e.g., the token stream represented in FIG. 13—can be parsed into the tokenized statement illustrated in FIG. 14. As another example, a token stream for an example "create table" statement of Table 1 can be parsed into the tokenized statement of FIG. 15A. The tokenized statement of FIG. 15A is further illustrated in FIG. 15B and FIG. 15C (the rawSQL is truncated for brevity).

Each SQL reader can have a different representation of the tokenized statement (e.g., a different representation of a TokenizedStatement of FIG. 10) based on the "keywords" for that reader. The SQL readers are implemented with logic to determine if the tokenized statement matches the structure for that reader and if it matches, looks for values to construct a change object. The reader will return the change object if it is able to populate it from the tokenized statement, otherwise returns null.

In the exemplary tokenized statement of FIG. 10, a number of token classes are shown (KeywordToken, GroupedTokens, ObjectNameToken, QuotedString Token, tokenizedClause, TokenStream, TokenizedStatement), with each having fields with the respective token class (e.g., keyword, startToken, groups, endToken, catalog, etc.). In this example, the TokenStream class is a list of all of the tokens. The ObjectNameToken class relates to the names of objects. The QuotedStringToken class relates to token chunks that may be different from an object name or keyword. The GroupedTokens class enables a group of tokens to be treated one chunk or one token. The TokenizedClause class is similar to the QuotedString Token class. The TokenizedStatement can be considered to be an object that is a rolled up version of the entire process shown in FIG. 10, including the objects above it in FIG. 10.

The SQL readers work their way through the tokenized statement by applying small logic to different segments of the statement. According to one embodiment, the code works on sub-streams created from the token stream. For example, for the create table statement of Table 1, a CreateTable SQL reader of one embodiment first looks for the table name and schema in the object name token after the "table" keyword and then further logic to add columns will work on each of the grouped tokens to parse the column definition. FIG. 16 illustrates one example of a token stream for the "CUSTOMER_ID" column.

Once the SQL reader goes through the statement and extracts values and populates the change object, another SQL reader goes through the statement to try and parse another change object. For example, an AddPimaryKey reader will parse the create table statement and return a, AddPrimaryKeyChange object because of the Primary Key Constraint in the SQL statement.

Referring again to FIG. 7, if no change object is created from a tokenized statement (e.g., there is no reader for the statement), a rawSQL change object is created (step 720) that indicates that the tokenized statement could not be parsed into another type of change object.

Thus, after passing through all the SQL Readers, the three split sql statements will return the following four Liquibase change objects: Create Table Change; Add Primary Key Change; Raw SQL Change (for comment); and Create Index Change. FIG. 7 is provided as one non-limiting example of a method for parsing SQL. Steps may be repeated as needed or desired, additional or alternative steps performed, or steps omitted.

FIG. 8 is flow chart illustrating one embodiment of a deployment method using Liquibase. According to one embodiment, Liquibase is initialized (step 802) and the database is updated according to the original SQL (step 804). Note that the database could be updated according to the change objects, but in some embodiments the change objects are used for evaluating rules and simulations. A deployment report is created (step 806) and the audit database is updated (step 808). FIG. 8 is provided as one non-limiting example of a method for parsing SQL. Steps may be repeated as needed or desired, additional or alternative steps performed, or steps omitted.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented by execution of suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented using control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement through execution of software programming or code steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code executed by a processor, by using application specific integrated circuits, programmable logic devices, field programmable gate arrays, optical, chemical, biological, quantum or nanoengineered systems, components and mechanisms. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract, Summary or Appendices is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A system, comprising:
a database change management system coupled to a database server maintaining a database according to a database schema, the database change management system including a processor and a non-transitory computer readable medium storing computer executable instructions executable to provide a set of services comprising:
a packaging service configured to:
retrieve Structured Query Language (SQL) scripts from a source code manager repository;
package the SQL scripts, wherein packaging the SQL scripts comprises generating changesets pointing to the SQL scripts;
process the changesets to generate change objects that model changes to be applied to the database, wherein generating the change objects comprises parsing the SQL scripts and identifying, from the SQL scripts, the changes to be applied to the database;
apply the changes in the change objects to a virtual model of the database to simulate changing the database;
generate a forecast report based on simulating changing the database, wherein the forecast report is indicative of a prediction of a failure or success of an implementation of the changes to the database; and
responsive to a predicted implementation success, deploy the changes to the database.

2. The system of claim 1, wherein the packaging service is configured to:
responsive to a predicted implementation failure, restore the database to a previous state.

3. The system of claim 1, wherein the packaging service is configured to:
responsive to the predicted implementation success, store a project, including associated database changes, in an artifact store for deployment in a production tier.

4. The system of claim 1, wherein parsing the SQL scripts further comprises stripping out SQL comments from the SQL script.

5. The system of claim 1, wherein parsing the SQL scripts further comprises substituting SQL properties of one or more attribute values.

6. The system of claim 1, wherein parsing the SQL scripts further comprises replacing package blocks with placeholder, the package blocks comprising nested blocks of SQL code, wherein the nested blocks of SQL code comprise nested SQL blocks comprising one or more of functions or procedures.

7. The system of claim 1, wherein parsing the SQL scripts further comprises splitting SQL text into individual blocks of SQL statements.

8. The system of claim 7, wherein parsing the SQL scripts further comprises tokenizing each of the blocks of SQL statements.

9. The system of claim 8, wherein parsing the SQL scripts further comprises parsing the tokenized SQL statements into the change objects.

10. The system of claim 1, wherein parsing the SQL scripts further comprises:
stripping out SQL comments from the SQL script;
substituting SQL properties of one or more attribute values;
splitting SQL text into individual blocks of SQL statements;
tokenizing each of the blocks of SQL statements; and
parsing the tokenized SQL statements into the change objects.

11. The system of claim 1, wherein the packaging service is configured to:
responsive to retrieving SQL scripts from the source code manager repository, checking the retrieved SQL scripts for compliance with SQL compliance rules.

12. The system of claim 1, wherein the packaging service is configured to back up the database.

13. The system of claim 1, wherein the packaging service is configured to, if the SQL scripts include rollbacks, run the SQL scripts against the database to execute the rollbacks prior to generating the forecast report.

14. A method for database change management comprising, at a first computing device communicatively coupled to a database server:
opening a connection from the first computing device to a database maintained by the database server according to a database schema;
retrieving Structured Query Language (SQL) scripts from a source code manager repository;
packaging the SQL scripts, wherein packaging the SQL scripts comprises generating changesets pointing to corresponding SQL scripts;
processing the changesets to generate change objects, wherein generating the change objects comprises parsing the SQL scripts and identifying, from the SQL scripts, the changes to be applied to the database;
applying changes in the change objects to a virtual model of the database to simulate changing the database;
generating a forecast report based on simulating changing the database, wherein the forecast report is indicative of a prediction of a failure or success changing the database; and
responsive to a predicted success of changing the database, deploying the changes to the database.

15. The method of claim 14, wherein parsing the SQL scripts further comprises stripping out SQL comments from the SQL script.

16. The method of claim 14, wherein parsing the SQL scripts further comprises substituting SQL properties of one or more attribute values.

17. The method of claim 14, wherein parsing the SQL scripts further comprises replacing package blocks with placeholder, the package blocks comprising nested blocks of SQL code, wherein the nested blocks of SQL code comprise nested SQL blocks comprising one or more of functions or procedures.

18. The method of claim 14, wherein parsing the SQL scripts further comprises splitting SQL text into individual blocks of SQL statements.

19. The method of claim 18, wherein parsing the SQL scripts further comprises tokenizing each of the blocks of SQL statements.

20. The method of claim 19, wherein parsing the SQL scripts further comprises parsing the tokenized SQL statements into the change objects.

\* \* \* \* \*